United States Patent
Chin et al.

(10) Patent No.: US 8,085,703 B2
(45) Date of Patent: Dec. 27, 2011

(54) METHODS AND SYSTEMS FOR ACCELERATING WIRELESS COMMUNICATION HANDOVER

(75) Inventors: Tom Chin, San Diego, CA (US); Shan Qing, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 721 days.

(21) Appl. No.: 12/123,410

(22) Filed: May 19, 2008

(65) Prior Publication Data

US 2009/0285177 A1 Nov. 19, 2009

(51) Int. Cl.
*H04B 7/204* (2006.01)
*H04W 4/00* (2009.01)
*H04W 36/00* (2009.01)

(52) U.S. Cl. ......... 370/319; 370/331; 370/338; 455/436

(58) Field of Classification Search .......... 370/310–350; 455/432.1–448
See application file for complete search history.

(56) References Cited

U.S. PATENT DOCUMENTS

| | | | |
|---|---|---|---|
| 7,310,303 B2 * | 12/2007 | Koo et al. | 370/206 |
| 7,336,647 B2 * | 2/2008 | Muharemovic et al. | 370/350 |
| 7,613,463 B2 * | 11/2009 | Dharia et al. | 455/450 |
| 2005/0058058 A1 * | 3/2005 | Cho et al. | 370/208 |
| 2005/0249156 A1 * | 11/2005 | Jelavic et al. | 370/329 |
| 2007/0202882 A1 * | 8/2007 | Ju et al. | 455/450 |
| 2007/0291680 A1 * | 12/2007 | Machida | 370/328 |
| 2009/0201877 A1 * | 8/2009 | Noh et al. | 370/330 |
| 2010/0111005 A1 * | 5/2010 | Ahn et al. | 370/329 |

FOREIGN PATENT DOCUMENTS

| | | |
|---|---|---|
| EP | 1469697 | 10/2004 |
| JP | 2006510279 A | 3/2006 |

OTHER PUBLICATIONS

Anonymous: Extract from IEEE P802.16e/D7, Apr. 2005 "Draft IEEE Standard for local and metropolitan area networks; Part 16: Air interface for fixed and mobile broadband wireless access systems; Amendment for physical and medium access control layers for combined fixed and mobile operation in licensed bands," IEEE [Apr. 8, 2005] pp. 194-196, XP002545971.
Anonymous: Extract from IEEE P802.16e/D8, May 2005 "Draft IEEE Standard for local and metropolitan area networks; Part 16: Air interface for fixed and mobile broadband wireless access systems; Amendment for physical and medium access control layers for combined fixed and mobile operation in licensed bands," (May 20, 2005), XP002545972.
Chen, J. et al.: "Pre-Coordination Mechanism for Fast Handover in WiMAX Networks," 2nd Intl Conference on Wireless Broadband and Ultra Wideband Communications, 2007, AUSWIRELESS 2007, (Aug. 1, 2007), XP031132757, ISBN: 978-0-7695-2842-7.
International Search Report / Written Opinion—PCT/US09/043440—International Search Authority EPO- (Nov. 4, 2009).
Lee, Hyun-Jin et al.: "A handover time negotiation mechanism for seamless service in IEEE 802.16E," (Nov. 16, 2008), Military Communications Conference 2008, pp. 1-7, XP031408413, ISBN: 978-1-4244-2676-8.

* cited by examiner

*Primary Examiner* — Tri H Phan
(74) *Attorney, Agent, or Firm* — Charles Chesney

(57) ABSTRACT

Methods and apparatus for ranging with one or more neighboring sectors during normal operation of a mobile station (MS) with its serving sector are provided. The ranging results may be frequently updated in an effort to accelerate the handover process to another base station (BS) providing coverage for one of the neighboring sectors.

35 Claims, 11 Drawing Sheets

| Parameter Name | Remark |
|---|---|
| Management Message Type = 5 | RNG-RSP |
| Timing Adjustment | |
| Power Level Adjust | |
| Offset Frequency Adjust | |
| Ranging Status | 1 = continue, 2 = abort, 3 = success, 4 = re-range |
| Ranging code attributes | Bits 31:22 - Used to indicate the OFDM time symbol reference that was used to transmit the ranging code.<br>Bits 21:16 - Used to indicate the OFDMA subchannel reference that was used to transmit the ranging code.<br>Bits 15:8 - Used to indicate the ranging code index that was sent by the MS.<br>Bits 7:0 - The 8 least significant bits of the frame number of the OFDMA frame where the MS sent the ranging code. |

FIG. 9

METHODS AND SYSTEMS FOR ACCELERATING WIRELESS COMMUNICATION HANDOVER

TECHNICAL FIELD

Certain embodiments of the present disclosure generally relate to wireless communication and, more particularly, to the ranging process during handover in wireless communication systems.

BACKGROUND

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations. For various reasons, such as a mobile station (MS) moving away from the area covered by one base station and entering the area covered by another, a handover (also known as a handoff) may be performed to transfer communication services (e.g., an ongoing call or data session) from one base station to another.

Three handover methods are supported in the mobile WiMAX specification; one is mandatory and other two are optional. The mandatory handover method is called the hard handover (HHO) and is the only type required to be implemented by mobile WiMAX initially. HHO implies an abrupt transfer of connection from one BS to another. The handover decisions may be made by the MS or the BS based on measurement results reported by the MS. The MS may periodically conduct an RF scan and measure the signal quality of neighboring base stations. The handover decision may arise, for example, from the signal strength from one cell exceeding the current cell, the MS changing location leading to signal fading or interference, or the MS requiring a higher Quality of Service (QoS). Scanning is performed during scanning intervals allocated by the BS. During these intervals, the MS is also allowed to optionally perform initial ranging and to associate with one or more neighboring base stations. Once a handover decision is made, the MS may begin synchronization with the downlink transmission of the target BS, may perform ranging if it was not done while scanning, and may then terminate the connection with the previous BS. Any undelivered Protocol Data Units (PDUs) at the BS may be retained until a timer expires.

SUMMARY

Certain embodiments of the present disclosure generally relate to performing initial ranging with neighboring sectors during normal operation of a mobile station with its serving sector and updating the ranging results in an effort to accelerate the handover process to another base station providing service coverage for one of the neighboring sectors.

Certain embodiments of the present disclosure provide a method. The method generally includes transmitting an uplink (UL) packet to a serving base station during a normal operation mode, transmitting one or more ranging requests to one or more neighboring base stations while transmitting the UL packet, receiving one or more ranging responses based on the ranging requests, and updating ranging results based on the ranging responses.

Certain embodiments of the present disclosure provide a transceiver for wireless communication. The transceiver generally includes first transmission logic configured to transmit a UL packet to a serving base station during a normal operation mode, second transmission logic configured to transmit one or more ranging requests to one or more neighboring base stations while transmitting the UL packet, reception logic configured to receive one or more ranging responses based on the ranging requests, and updating logic configured to update ranging results based on the ranging responses.

Certain embodiments of the present disclosure provide an apparatus for wireless communication. The apparatus generally includes means for transmitting a UL packet to a serving base station during a normal operation mode, means for transmitting one or more ranging requests to one or more neighboring base stations while transmitting the UL packet, means for receiving one or more ranging responses based on the ranging requests, and means for updating ranging results based on the ranging responses.

Certain embodiments of the present disclosure provide a mobile device. The mobile device generally includes a transceiver configured to transmit a UL packet to a serving base station during a normal operation mode, to transmit one or more ranging requests to one or more neighboring base stations while transmitting the UL packet, and to receive one or more ranging responses based on the ranging requests; and updating logic configured to update ranging results based on the ranging responses.

Certain embodiments of the present disclosure provide a mobile device. The mobile device generally includes a first transceiver configured to transmit a UL packet to a serving base station during a normal operation mode, a second transceiver configured to transmit one or more ranging requests to one or more neighboring base stations while transmitting the UL packet and to receive one or more ranging responses based on the ranging requests, and updating logic configured to update ranging results based on the ranging responses.

Certain embodiments of the present disclosure provide a computer-readable medium containing a program for maintaining updated ranging results for wireless communication, which, when executed by a processor, performs certain operations. The operations generally include transmitting a UL packet to a serving base station during a normal operation mode, transmitting one or more ranging requests to one or more neighboring base stations while transmitting the UL packet, receiving one or more ranging responses based on the ranging requests, and updating ranging results based on the ranging responses.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIG. 9 illustrates the format of a ranging response (RNG-RSP) message from initial ranging, in accordance with certain embodiments of the present disclosure.

DETAILED DESCRIPTION

Certain embodiments of the present disclosure provide techniques and apparatus for ranging with one or more neighboring sectors during normal operation of a mobile station (MS) with its serving sector. The ranging results may be frequently updated in an effort to accelerate the handover process to another base station (BS) providing coverage for one of the neighboring sectors.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards defined at least four different physical layers (PHYs) and one media access control (MAC) layer. The OFDM and OFDMA physical layer of the four physical layers are the most popular in the fixed and mobile BWA areas respectively.

Figure 1:
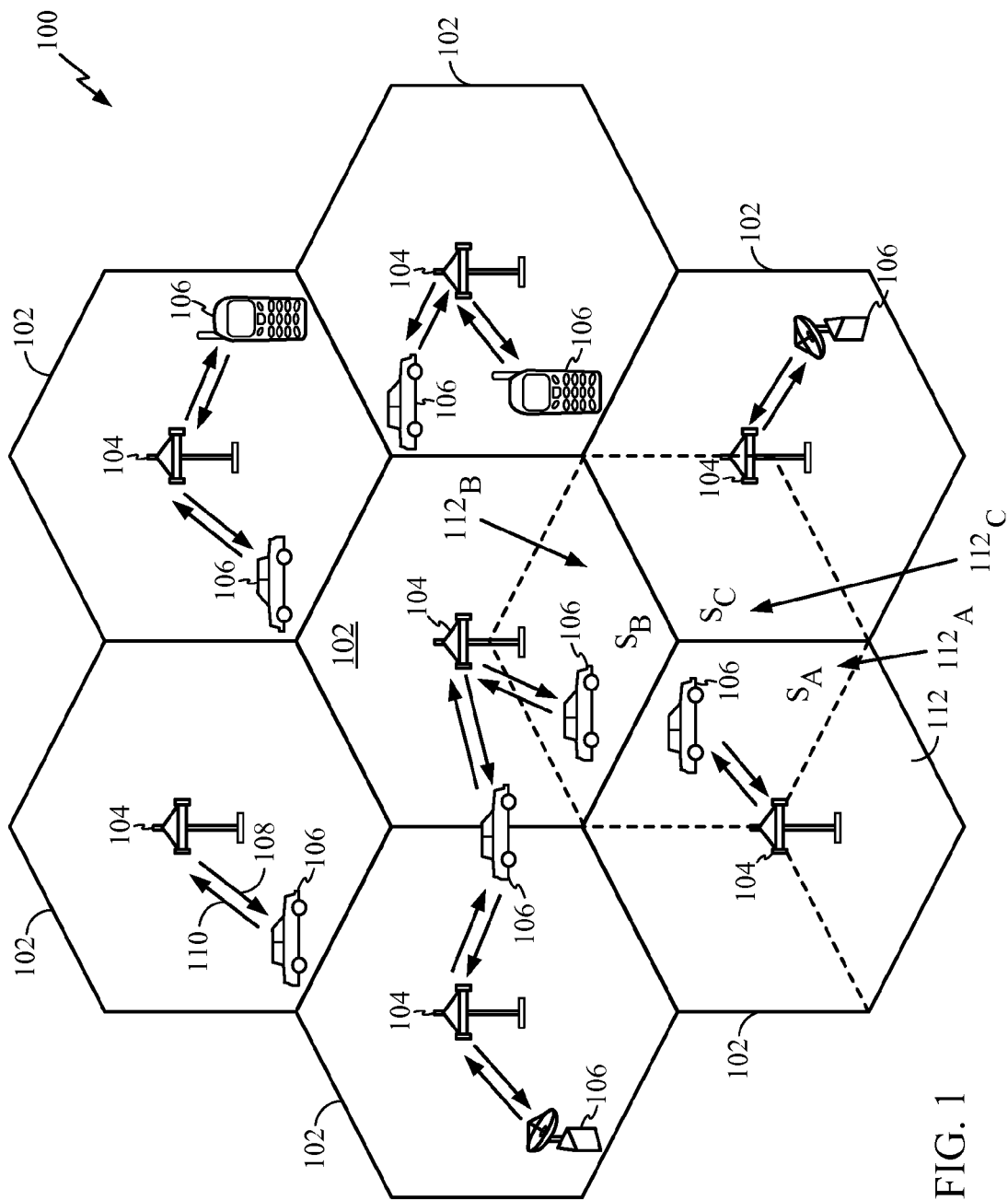
FIG. 1 illustrates an example wireless communication system, in accordance with certain embodiments of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas. For example, base station $104_A$ may provide directional coverage for sector A $112_A$, base station $104_B$ may provide directional coverage for sector B $112_B$, and base station $104_C$ may provide directional coverage for sector C $112_C$ as illustrated in FIG. 1.

Figure 2:
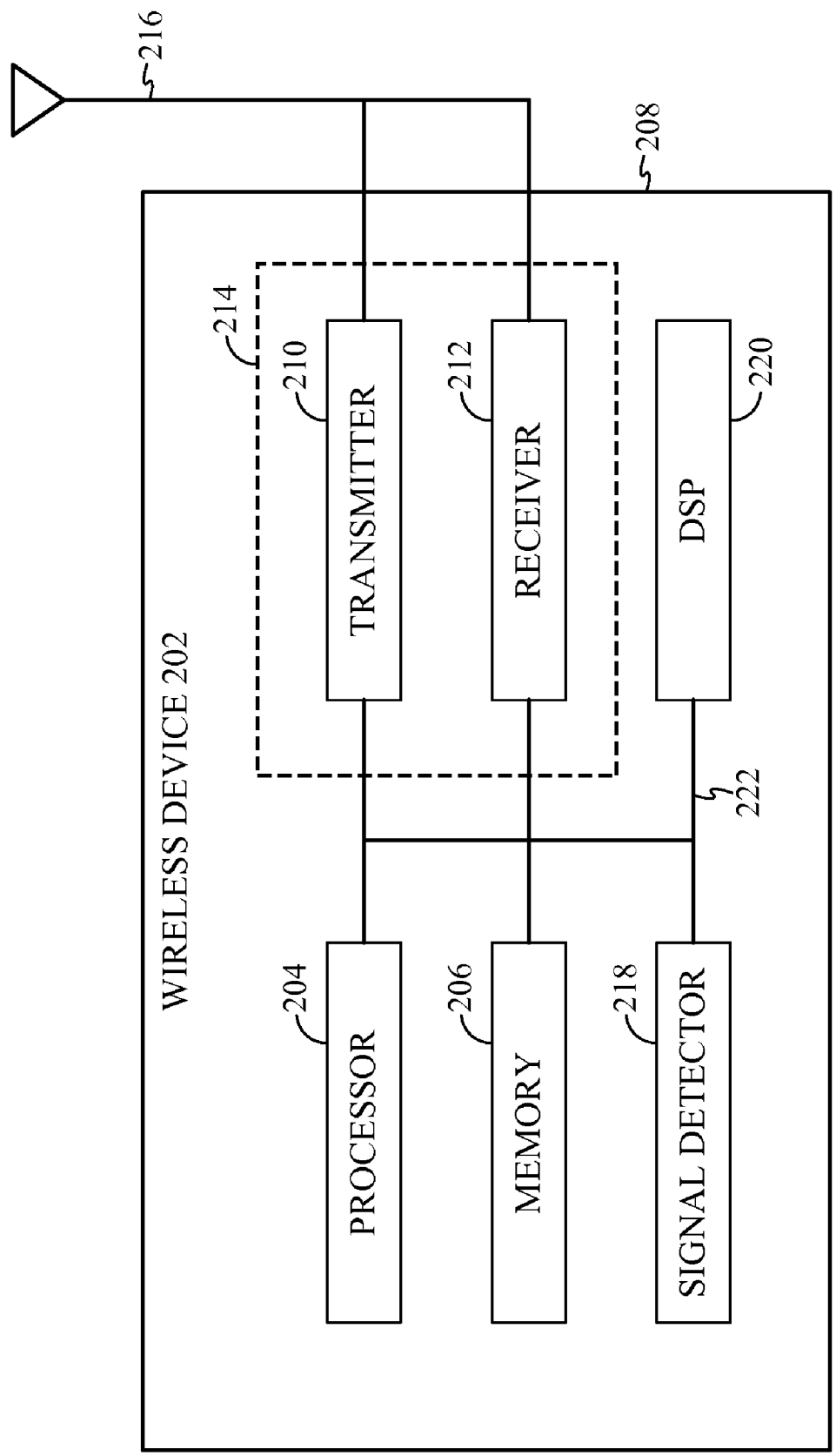
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
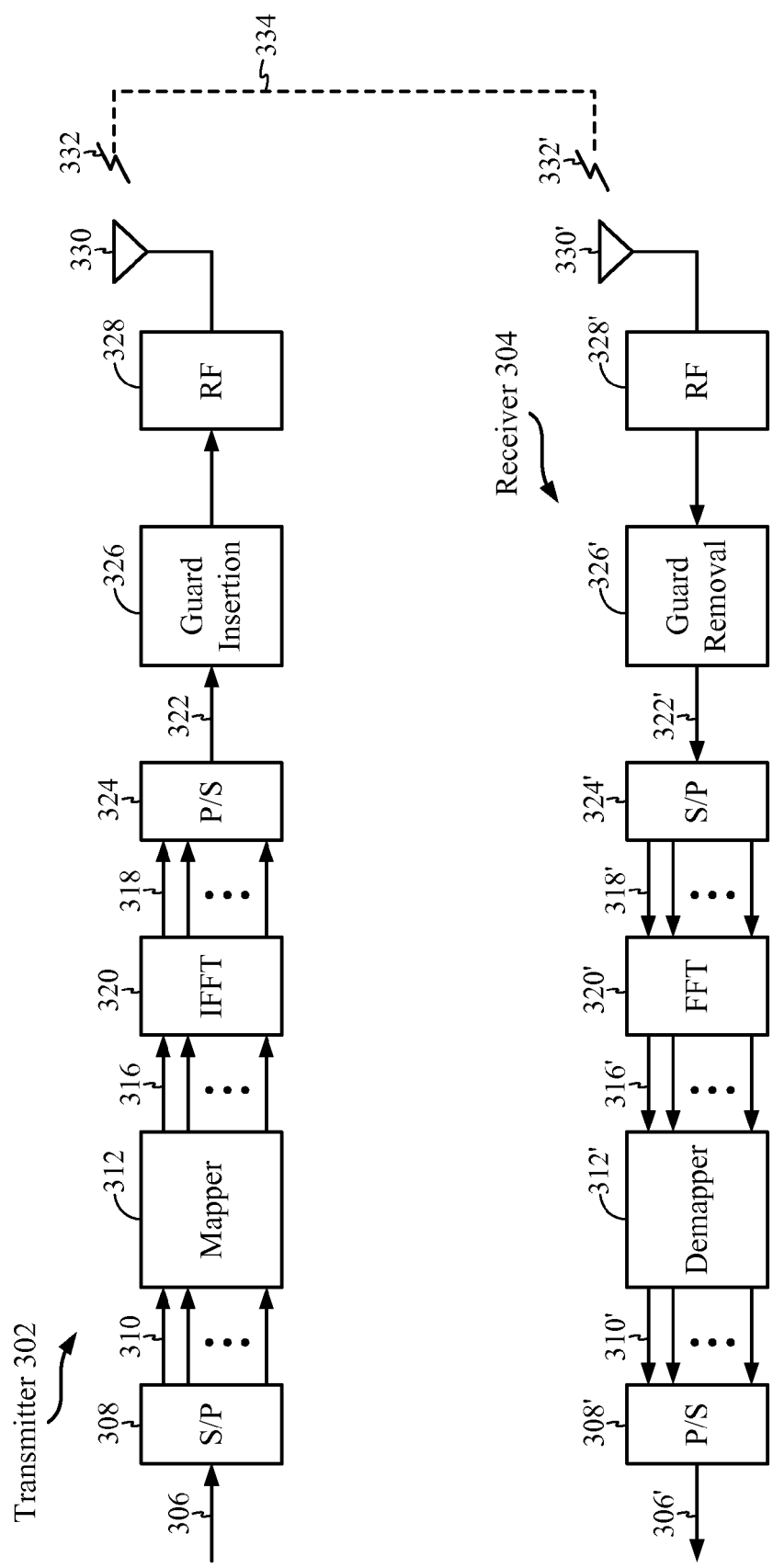
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDMA Frame

Figure 4:
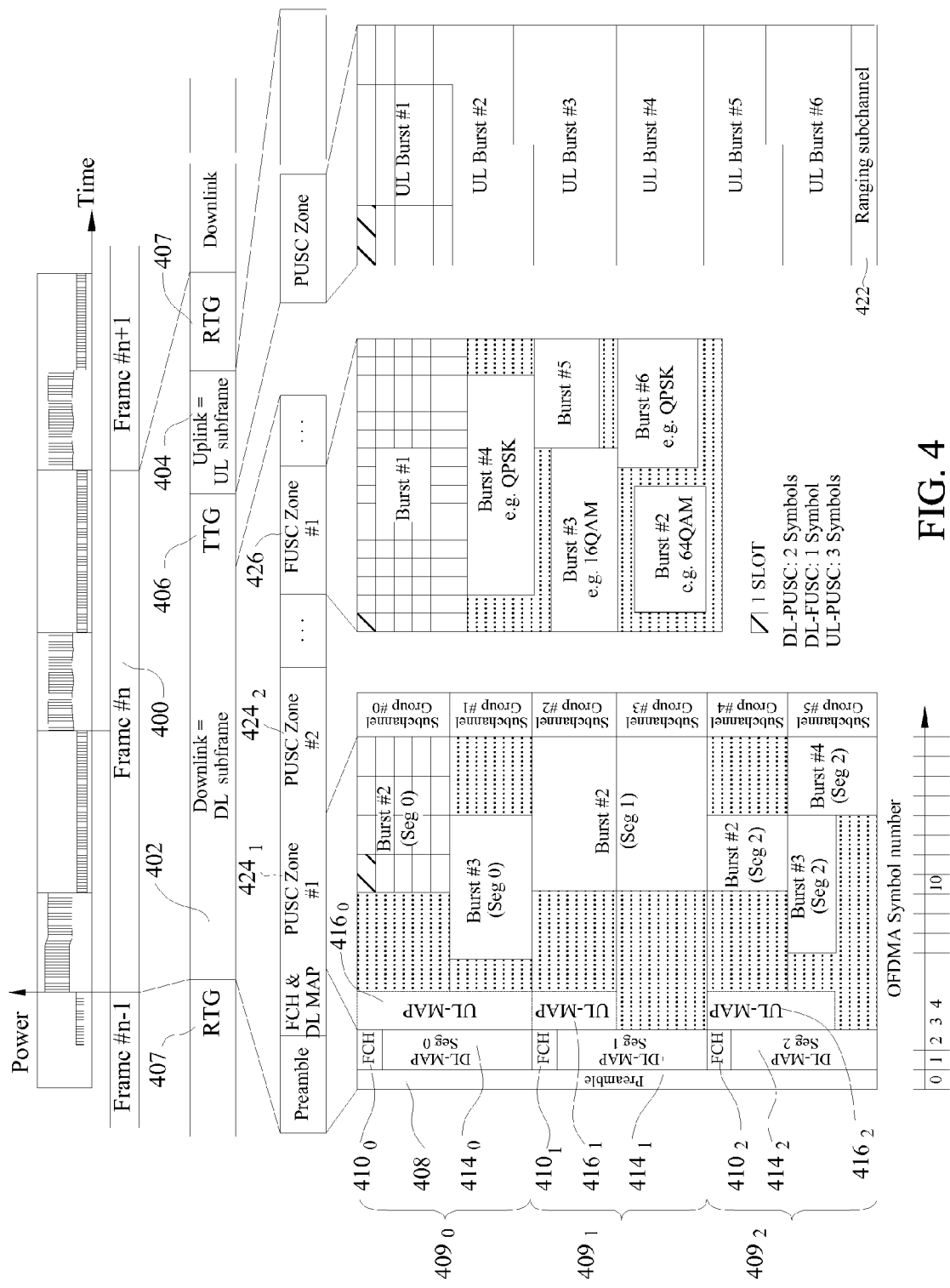
FIG. 4 illustrates an example OFDMA frame for Time Division Duplex (TDD) with three segments, in accordance with certain embodiments of the present disclosure.

Referring now to FIG. 4, an OFDMA frame 400 for a Time-Division Duplex (TDD) implementation is depicted as a typical, but not limiting, example. Other implementations of an OFDMA frame, such as Full and Half-Duplex Frequency-Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval—or, more specifically, by Transmit/Receive and Receive/Transmit Transition Gaps (TTG 406 and RTG 407, respectively)—in an effort to prevent DL and UL transmission collisions. The DL-to-UL-subframe ratio may be varied from 3:1 to 1:1 to support different traffic profiles.

Within the OFDMA frame 400, various control information may be included. For example, the first OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments 409 of the zone are used. For example, carriers 0, 3, 6, . . . may indicate that segment 0 ($409_0$) is to be used, carriers 1, 4, 7, . . . may indicate that segment 1 ($409_1$) is to be used, and carriers 2, 5, 8, . . . may indicate that segment 2 ($409_2$) is to be used.

A Frame Control Header (FCH) 410 may follow the preamble 408, one FCH 410 per segment 409. The FCH 410 may provide frame configuration information, such as the usable subchannels, the modulation and coding scheme, and the MAP message length for the current OFDMA frame. A data structure, such as the downlink Frame Prefix (DLFP), outlining the frame configuration information may be mapped to the FCH 410. The DLFP for Mobile WiMAX may comprise a used subchannel (SCH) bitmap, a reserved bit set to 0, a repetition coding indication, a coding indication, a MAP message length, and four reserved bits set to 0. Before being mapped to the FCH 410, the 24-bit DLFP may be duplicated to form a 48-bit block, which is the minimal forward error correction (FEC) block size.

Following the FCH 410 in each segment 409, a DL-MAP 414 and a UL-MAP 416 may specify subchannel allocation and other control information for the DL and UL subframes 402, 404, respectively. In the case of OFDMA, multiple users may be allocated data regions within the frame 400, and these allocations may be specified in the DL and UL-MAP 414, 416. The MAP messages may include the burst profile for each user, which defines the modulation and coding scheme used in a particular link. Since MAP messages contain critical information that needs to reach all users for that segment 409, the DL and UL-MAP 414, 416 may often be sent over a very reliable link, such as BPSK or QPSK with rate 1/2 coding and repetition coding. The DL subframe 402 of the OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first DL burst in the DL subframe 402, may contain information about the location of the UL burst for different users. The UL subframe 404 may include additional control information as illustrated in FIG. 4, such as a UL Ranging subchannel 422 allocated for the mobile station to perform closed-loop time, frequency, and power adjustments during network entry and periodically afterward, as well as bandwidth requests. The UL subframe 404 may also include a UL ACK (not shown) allocated for the mobile station (MS) to feed back a DL hybrid automatic repeat request acknowledgment (HARQ ACK) and/or a UL CQICH (not shown) allocated for the MS to feed back channel state information on the Channel Quality Indicator channel (CQICH).

Figure 5:
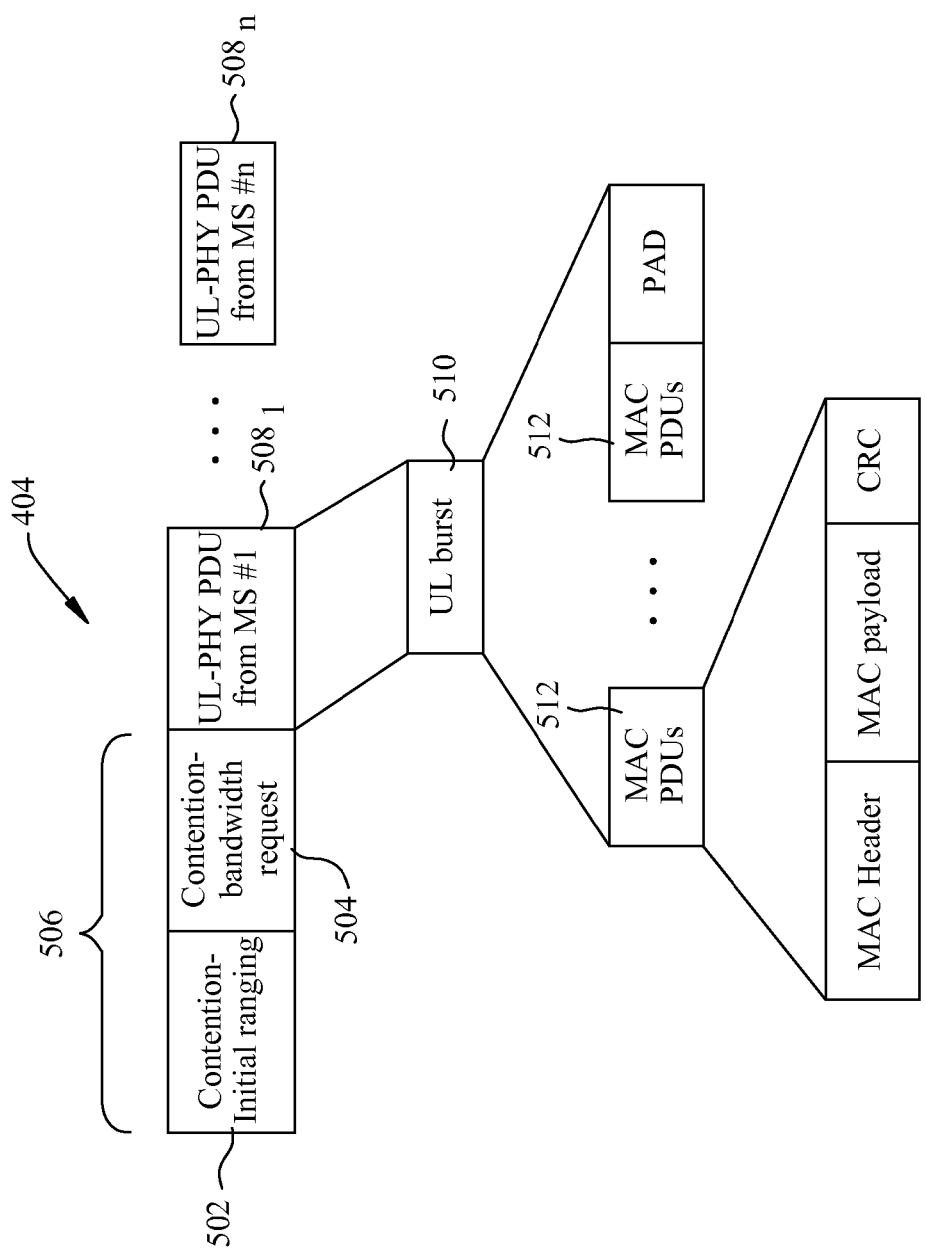
FIG. 5 illustrates an example uplink (UL) subframe of the OFDMA frame, in accordance with certain embodiments of the present disclosure.

Referring now to FIG. 5, the UL subframe 404 may also contain two initial channels for contention-based access. The contention-based initial ranging channel 502 may be used for the initial ranging of newly joining mobile stations, for example. The contention-based bandwidth request channel 504 may be used for the best effort traffic/bandwidth requests of already associated mobile stations, for example. Furthermore, if a mobile station 106 is going to transmit only a single packet to the base station 104, the mobile station 106 may use the contention-based portion 506 of the UL subframe 404 instead of acquiring a dedicated bandwidth. The UL ranging subchannel 422 may be used for the contention-based portion 506 of the UL subframe 404.

UL physical layer (PHY) Protocol Data Units (PDUs) 508 for different mobile stations containing the UL data bursts 510, which have been mapped from one or more Media Access Control (MAC) PDUs 512, may follow the contention-based portion 506. The MAC PDUs 512 may comprise MAC layer management messages. Altogether, the preamble 408, the FCH 410, the DL-MAP 414, and the UL-MAP 416 may carry information that enables the receiver 304 to correctly demodulate the received signal.

Returning to FIG. 4, different "modes" can be used for DL and UL transmission in OFDMA. An area in the time domain where a certain mode is used is generally referred to as a zone. One type of zone is called a DL-PUSC (downlink partial usage of subchannels) zone 424 and may not use all the subchannels available to it (i.e., a DL-PUSC zone 424 may only use particular groups of subchannels). There may be a total of six subchannel groups, which can be assigned to up to three segments 409. Thus, a segment may contain one to six subchannel groups (e.g., segment 0 may contain two subchannel groups 0 and 1, segment 1 may contain two subchannel groups 2 and 3, and segment 2 may contain two subchannel groups 4 and 5 as illustrated in FIG. 4). Another type of zone is called a DL-FUSC (downlink full usage of subchannels) zone 426. Unlike DL-PUSC, DL-FUSC does not use any segments, but can distribute all bursts over the complete frequency range.

Exemplary Accelerated Handover

Figure 6A:
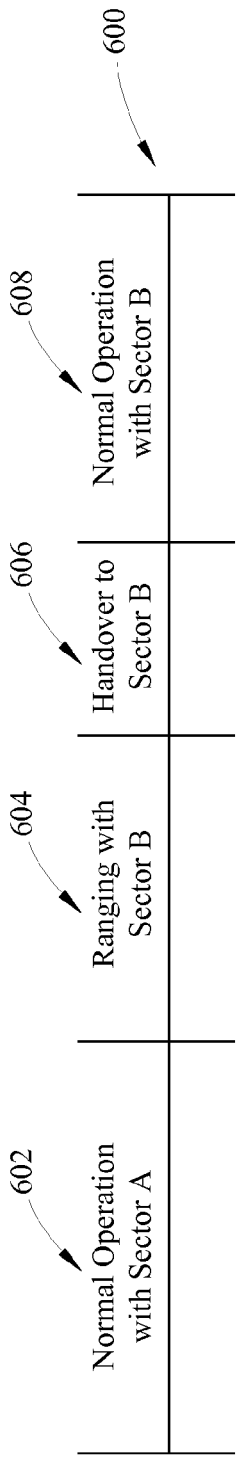
FIGS. 6A-C illustrate example handover timelines when switching from one base station to another, in accordance with certain embodiments of the present disclosure.

Referring now to the timeline 600 of FIG. 6A, a mobile station may be communicating with serving sector A $112_A$, for example, during a normal operation mode 602 using OFDMA frames as described above. When a mobile station decides to switch service from sector A to a new sector, such as sector B $112_B$, the mobile station may pause communication with sector A. The mobile station may start an initial ranging process 604 (also known as handover ranging) with the new sector B. Once a satisfactory ranging response has been received, the mobile station may perform a handover 606 to the new sector B, and then normal operation 608 may resume such that the mobile station is now communicating with the new serving sector B.

The ranging process 604 can potentially take a long time to complete. Therefore, the traffic break time (i.e., the time interval during which no traffic is exchanged between the mobile station and the network), may directly depend on how long it takes to complete the ranging process 604. By speeding up the ranging process 604, the traffic break time may be reduced, and data throughput may be increased.

Figure 7:
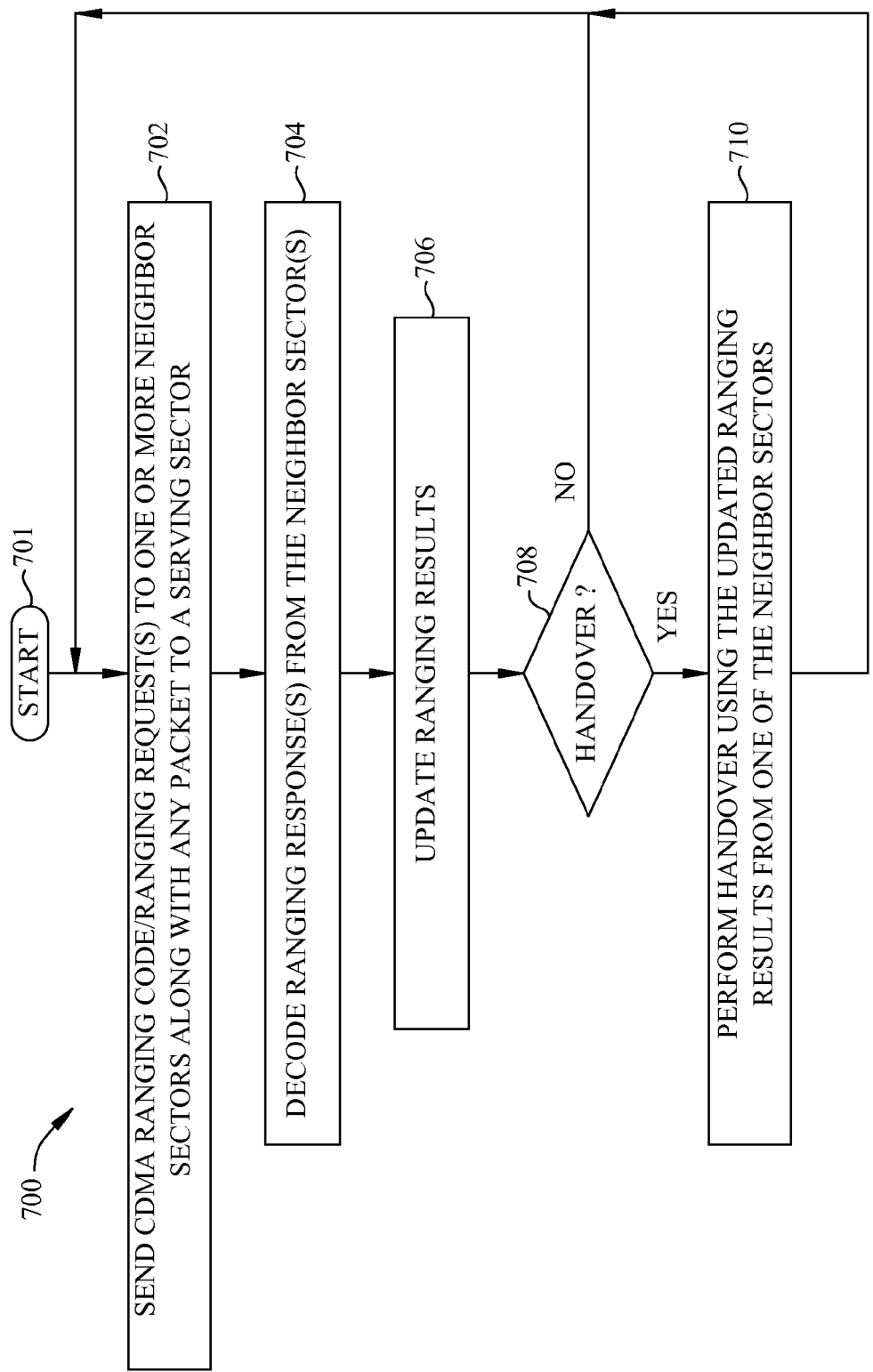
FIG. 7 is a flow chart of example operations for accelerated handover using updated ranging results collected by ranging with one or more neighboring sectors while conducting normal operations with a serving sector, in accordance with certain embodiments of the present disclosure.
Figure 7A:
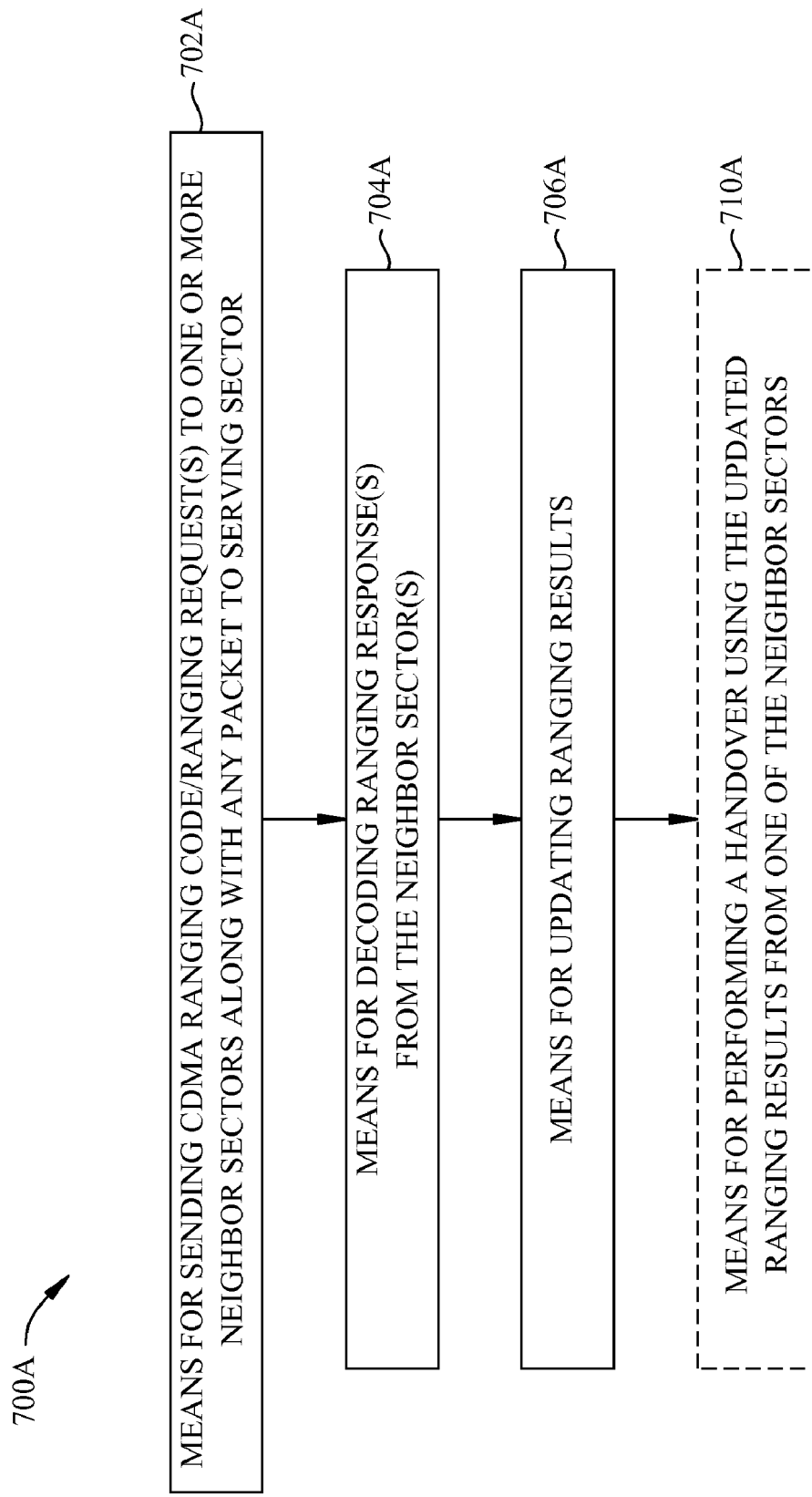
FIG. 7A is a block diagram of means corresponding to the example operations for accelerated handover of FIG. 7, in accordance with certain embodiments of the present disclosure.

Accordingly, FIG. 7 is a flow chart of example operations 700 for accelerated handover (also known as a handoff) in a mobile WiMAX system, for example. The operations 700 may begin at 701, for example, where a user terminal may be transmitting and receiving control and data packets in a normal operation mode. For example, a mobile station 800 in sector A 112$_A$ of FIG. 8A may be wirelessly communicating with base station 104$_A$. In this case, sector A is the serving sector for the mobile station 800. In mobile WiMAX, the serving sector may broadcast information for any neighboring sector, such as non-serving sectors B and C 112$_B$, 112$_C$. This information may include the channel structure of the neighboring sectors, as well as their initial ranging region locations.

Figure 8B:
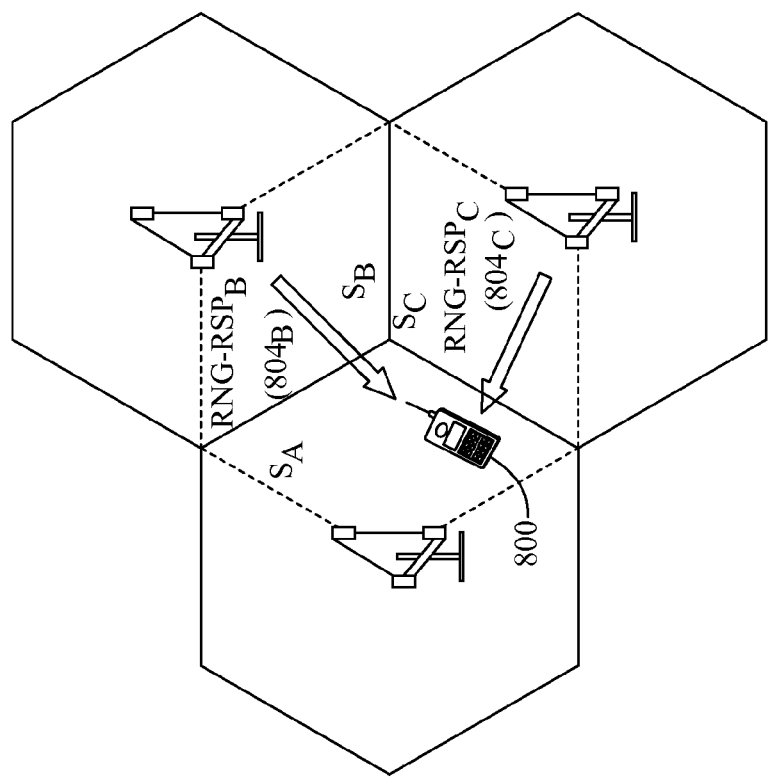
FIGS. 8A-C illustrate ranging with one or more neighboring sectors while conducting normal operations with a serving sector and performing accelerated handover using the updated ranging results, in accordance with certain embodiments of the present disclosure.
Figure 8A:
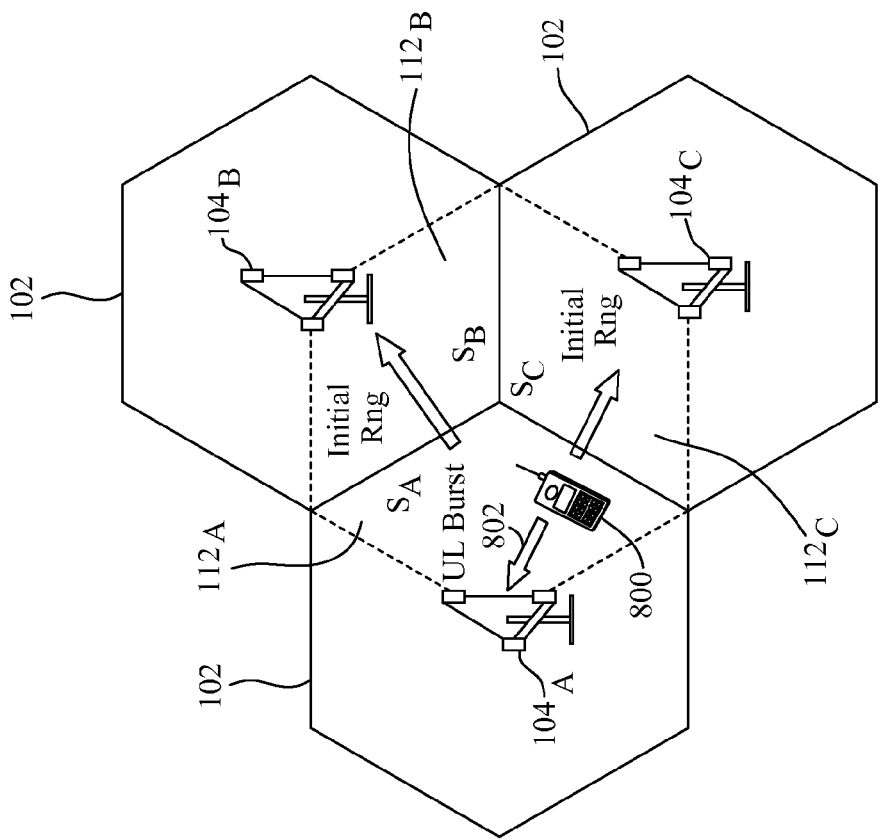

At 702, one or more code division multiple access (CDMA) ranging code/ranging requests may be sent to one or more neighboring sectors along with any packet to the serving sector. The CDMA ranging code/ranging request(s) may be sent in a certain OFDMA frame when the granted uplink bandwidth does not overlap with the initial ranging region allocated by the neighboring sectors or when a mobile station is not granted any uplink bandwidth by the serving sector. For example, the mobile station 800 in the serving sector may transmit a packet, such as a UL data burst 802, to the base station 104$_A$ as illustrated in FIG. 8A. Furthermore, the mobile station 800 may perform contention-based initial ranging with the non-serving neighboring sectors B and C 112$_B$, 112$_C$ while transmitting the packet to the serving sector. In other words, the ranging procedure with sectors B and C may be conducted in parallel while the mobile station 800 is exchanging traffic with sector A. Because the CDMA ranging code/ranging request(s) may be sent in the same OFDMA frame as the UL data burst 802, the data throughput may most likely not be affected by ranging during normal operation.

This initial ranging may be performed using the contention-based initial ranging channel 502 of the UL subframe 404 in the OFDMA frame 400 without involving any association signaling messages. The mobile station 800 may use a truncated exponential backoff algorithm to determine which initial ranging slot will be used to send the CDMA ranging code/ranging request message. The mobile station 800 may send the CDMA ranging code/ranging request(s) using the minimum power setting and may try again with increasingly higher transmission power until receiving a ranging response or a timeout occurs.

At 704, one or more ranging responses from the neighboring sector(s) may be received and decoded. For example, the broadcast ranging response (RNG-RSP) messages 804$_B$, 804$_C$ from the neighboring sectors B and C 112$_B$, 112$_C$ (transmitted by the base stations 104$_B$, 104$_C$, respectively) may be received and decoded by the mobile station 800 as illustrated in FIG. 8B. This reception scheme may work well in mobile WiMAX configurations where three different sectors (e.g., sectors A, B, and C) use three different segments in the OFDMA frame (i.e., three different sets of subcarriers with the same RF channel). When each set of subcarriers within a segment is spread out over the entire spectrum of the RF channel, the I/Q (in-phase/quadrature) samples from all three sectors may be received without having to tune the RF frequency and may be stored by a sample buffer. In other words, even when the mobile station is communicating with one of the three sectors (e.g., the serving sector), the mobile station can acquire information from (as well as transmit information to) the other two sectors (e.g., the neighboring sectors) without tuning the RF.

The RNG-RSP 804 of FIG. 8B is illustrated in more detail in FIG. 9. The RNG-RSP 804 may begin with a Management Message Type 902 having a length of 8 bits, which has a value of 5 (00000101$_b$) to indicate that the control message is a RNG-RSP. The Management Message Type 902 may be followed by a timing adjustment 904, a power level adjust 906, and an offset frequency adjust 908. The timing adjustment 904 and the power level adjust 906 may be based on the arrival time of the initial CDMA ranging code/ranging request and the measured power of the signal, and the base station receiving the request may command a timing advance and a power adjustment to the mobile station in the ranging response. The offset frequency adjust 908 may be followed by a ranging status 910, which may instruct the mobile station whether to continue (=1) ranging, abort (=2) ranging, stop ranging due to success (=3), or re-range (=4).

The ranging status 910 of FIG. 9 may be followed by ranging code attributes 912 having a length of 32 bits. The ten most significant bits (MSBs) (i.e., bits 31-22) of the ranging code attributes 912 may indicate the OFDM symbol reference used to transmit the ranging code, while the next six bits (i.e., bits 21-16) may indicate the OFDMA subchannel reference used. Bits 15-8 of the ranging code attributes 912 may indicate the ranging code index that was sent by the mobile station. The eight least significant bits (LSBs) (i.e., bits 7-0) may equal the 8 LSBs of the frame number of the OFDMA frame where the mobile station sent the ranging code. The mobile station may discern whether the RNG-RSP 804 is addressed to it based on "ranging code attributes" contained in the RNG-RSP 804.

At 706 in FIG. 7, the ranging results (e.g., timing, frequency, and power information) may be updated. The updated ranging results may be stored in memory on the mobile station. In other words, the timing adjustment 904, power level adjust 906, and the offset frequency adjust 908 of the RNG-RSP 804 of FIG. 9 may be saved in the mobile station 800 for future use. By sending one or more CDMA ranging code/ranging requests for initial ranging to one or more neighboring sectors along with any packet to the serving sector, the mobile station may keep the ranging results with neighboring sectors updated very often without affecting the data throughput.

If a handover need not be performed at 708, then the operations 700 may repeat beginning at 702. However, if a handover (initiated by the mobile station or a base station) is desired at 708, then at 710, the handover may be performed using the updated ranging results from one of the neighboring sectors (i.e., the future serving sector). By having frequently updated ranging results available, the ranging results may be used to speed up the handover process by reducing or removing the initial ranging step during the handover process. In other words, the traffic break time due to the hard handover (HHO) process may be reduced.

Furthermore, the operations 700 of FIG. 7 described above may help reduce association related signaling messages in the wireless channel and over the backbone network for association coordination since there is less need to conduct association ranging as specified in the IEEE 802.16e standard. Additional benefits may be obtained with the aid of network scheduling where neighboring sectors ensure that initial ranging region allocation by one sector does not overlap with bandwidth allocation granted to mobile stations by another sector. In this manner, the mobile station may send CDMA ranging code/ranging requests at any time.

Figure 6B:
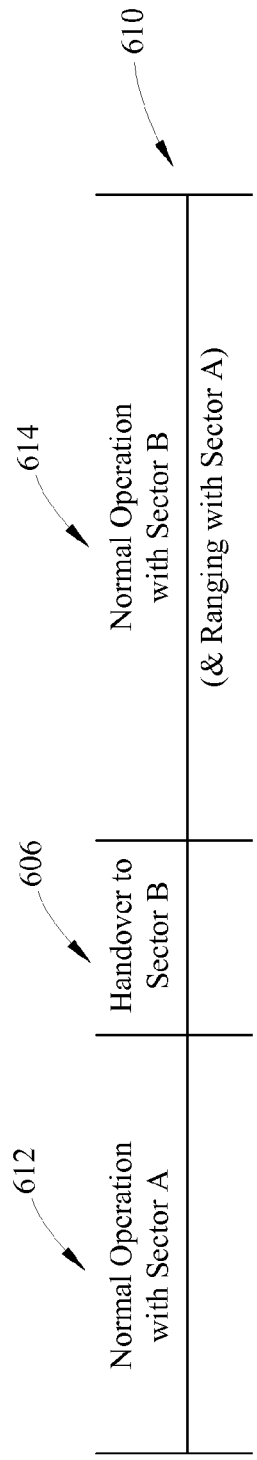
Figure 6C:
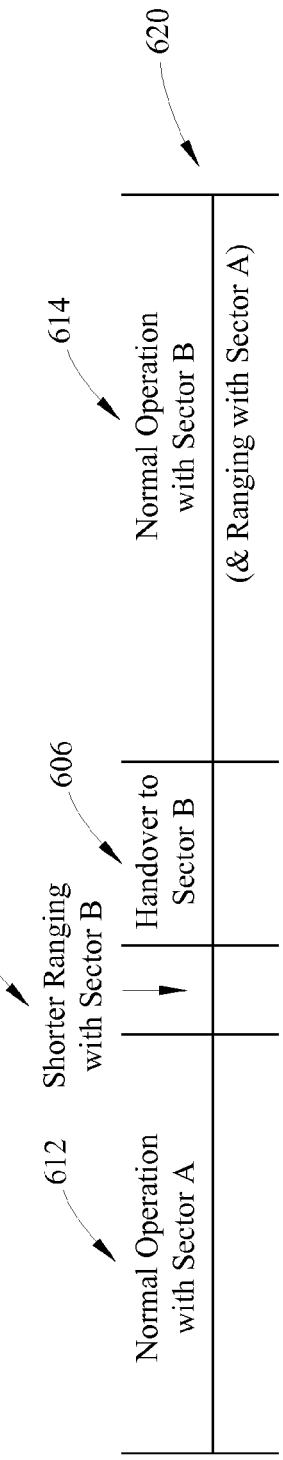

FIGS. 6B and 6C illustrate the time savings in the handover process from sector A 112$_A$ to sector B 112$_B$, for example, and the potential reduction in traffic break time for certain embodiments of the present disclosure when compared to FIG. 6A. Unlike the timeline 600 of FIG. 6A, the mobile station in the timeline 610 of FIG. 6B may be frequently ranging with one or more neighboring sectors (e.g., sector B 112$_B$) during the normal operation mode 612 in which the mobile station may be receiving traffic from and transmitting traffic to serving sector A $112_A$, for example. Once a handover from sector A to sector B is to be performed, the handover 606 to sector B may be performed based on the updated ranging results without any initial ranging with sector B. Compare the handover time of handover 606 to sector B in FIG. 6B to the significantly longer overall handover process time in FIG. 6A of ranging 604 and handover 606 to sector B.

Figure 8C:
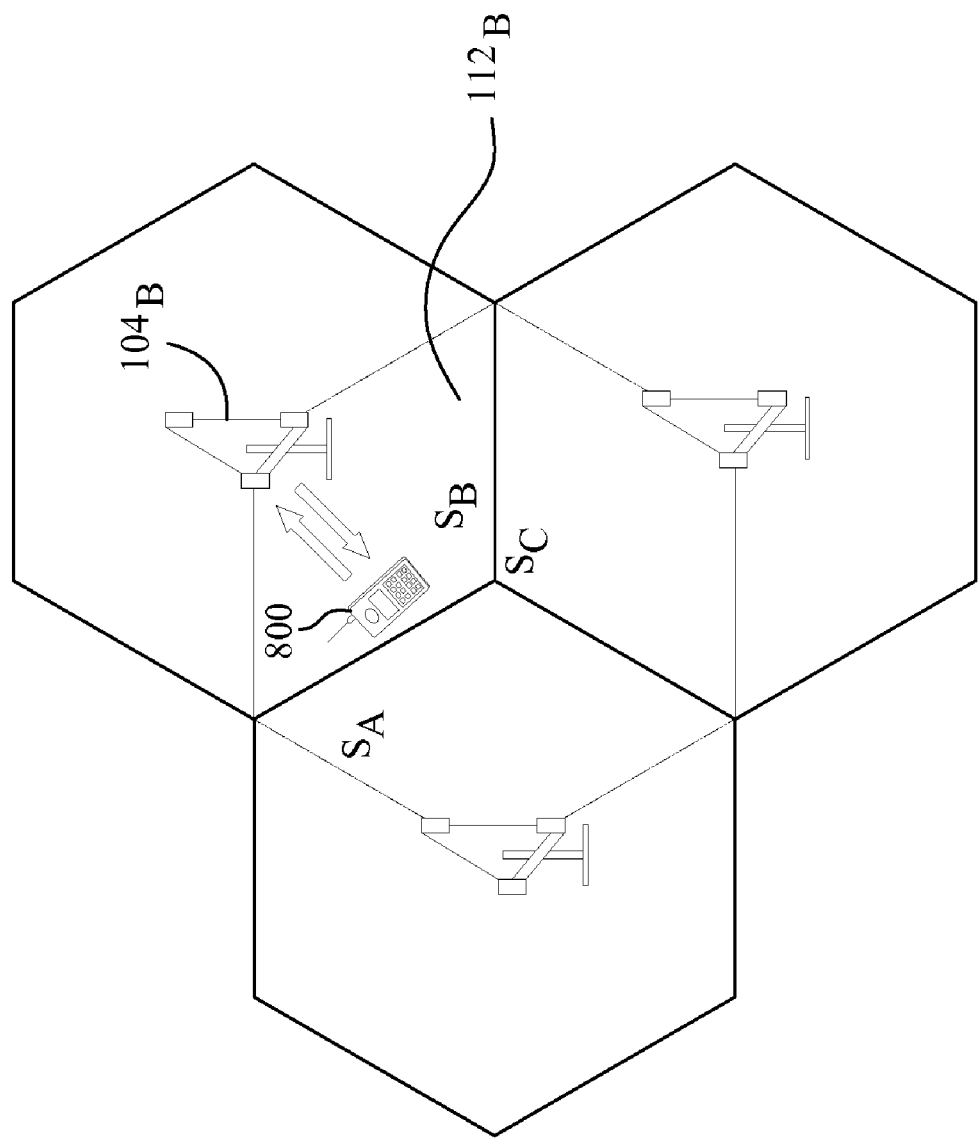

The handover 606 to sector B may be followed by a normal operation mode 614 in which the mobile station may be receiving traffic from and transmitting traffic to new serving sector B while ranging with one or more non-serving neighboring sectors, such as sector A $112_A$ and/or sector C $112_C$, for example. This scenario is illustrated in FIG. 8C, where the mobile station 800 has moved into sector B, a handover from serving sector A to neighboring sector B has been performed using the updated ranging results as described above, and sector B has become the new serving sector.

For some embodiments as illustrated in the timeline 620 of FIG. 6C, ranging 616 with sector B $112_B$ may still occur before the handover 606 to sector B $112_B$. However, by having updated ranging results from the neighboring sector(s), the ranging time during ranging 616 may still be significantly shorter than the ranging 604 with sector B $112_B$ in the timeline 600 of FIG. 6A. This is because the updated ranging results may be used as a starting point as opposed to beginning initial ranging from the typical starting point (i.e., with the lowest power setting and no knowledge of any timing or frequency offset adjustments).

In configurations where sectors A, B, and C use different RF channels rather than different sets of subcarriers within the same RF channel, the same scheme of ranging in parallel with normal traffic may still apply if the mobile station uses more than one independent transceiver. In such cases, a first transceiver may be used to communicate with the serving sector, while a second transceiver may be used to perform initial ranging with any neighboring sector.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions, or one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication comprising:
   (a) transmitting an uplink (UL) packet to a serving base station during a normal operation mode;
   (b) transmitting one or more code division multiple access (CDMA) ranging code/ranging requests to one or more neighboring base stations while transmitting the UL packet;
   (c) receiving one or more ranging responses based on the CDMA ranging code/ranging requests; and
   (d) updating ranging results based on the ranging responses.

2. The method of claim 1, further comprising initiating a handover based on the updated ranging results.

3. The method of claim 2, wherein initial ranging is not performed for the handover.

4. The method of claim 1, further comprising repeating steps a-d to keep the ranging results updated.

5. The method of claim 1, wherein the ranging results comprise at least one of timing, frequency, or power adjustment information.

6. The method of claim 1, wherein the UL packet is transmitted from a first transceiver and the CDMA ranging code/ranging requests are transmitted from a second transceiver.

7. The method of claim 1, wherein the UL packet and the CDMA ranging code/ranging requests are transmitted from the same transceiver.

8. The method of claim 1, wherein the CDMA ranging code/ranging requests are transmitted at any time according to network scheduling such that initial ranging region allocation from the neighboring base station does not overlap with bandwidth allocation from the serving base stations.

9. The method of claim 1, wherein the CDMA ranging code/ranging requests have a format in accordance with one or more standards of the Institute of Electrical and Electronics Engineers (IEEE) 802.16 family of standards.

10. A transceiver for wireless communication, comprising:
    first transmission logic configured to transmit an uplink (UL) packet to a serving base station during a normal operation mode;
    second transmission logic configured to transmit one or more code division multiple access (CDMA) ranging code/ranging requests to one or more neighboring base stations while transmitting the UL packet;
    reception logic configured to receive one or more ranging responses based on the CDMA ranging code/ranging requests; and
    updating logic configured to update ranging results based on the ranging responses.

11. The transceiver of claim 10, further comprising handover-initiation logic configured to initiate a handover based on the updated ranging results.

12. The transceiver of claim 11, wherein the handover-initiation logic does not perform initial ranging for the handover.

13. The transceiver of claim 10, wherein the ranging results comprise at least one of timing, frequency, or power adjustment information.

14. The transceiver of claim 10, wherein the first transmission logic is configured to transmit the UL packet using a different radio frequency (RF) channel than the second transmission logic uses to transmit the CDMA ranging code/ranging requests.

15. The transceiver of claim 10, wherein the first transmission logic is configured to transmit the UL packet using a first set of subcarriers and the second transmission logic is configured to transmit the CDMA ranging code/ranging requests using a second set of subcarriers, wherein the first and second sets of subcarriers are within the same radio frequency (RF) channel.

16. The transceiver of claim 10, wherein the CDMA ranging code/ranging requests have a format in accordance with one or more standards of the Institute of Electrical and Electronics Engineers (IEEE) 802.16 family of standards.

17. An apparatus for wireless communication, comprising:
    means for transmitting an uplink (UL) packet to a serving base station during a normal operation mode;
    means for transmitting one or more code division multiple access (CDMA) ranging code/ranging requests to one or more neighboring base stations while transmitting the UL packet;
    means for receiving one or more ranging responses based on the CDMA ranging code/ranging requests; and
    means for updating ranging results based on the ranging responses.

18. The apparatus of claim 17, further comprising means for initiating a handover based on the updated ranging results.

19. The apparatus of claim 18, wherein the means for initiating a handover do not perform initial ranging for the handover.

20. The apparatus of claim 17, wherein the means for transmitting the UL packet is a first transceiver and the means for transmitting the CDMA ranging code/ranging requests is a second transceiver.

21. The apparatus of claim 17, wherein the means for transmitting the UL packet and the means for transmitting the CDMA ranging code/ranging requests are the same transceiver.

22. The apparatus of claim 17, wherein the means for transmitting the CDMA ranging code/ranging requests is configured to transmit the CDMA ranging code/ranging requests at any time according to network scheduling such that initial ranging region allocation from the neighboring base station does not overlap with bandwidth allocation from the serving base stations.

23. The apparatus of claim 17, wherein the CDMA ranging code/ranging requests have a format in accordance with one or more standards of the Institute of Electrical and Electronics Engineers (IEEE) 802.16 family of standards.

24. A mobile device, comprising:
    a transceiver configured to transmit an uplink (UL) packet to a serving base station during a normal operation mode, to transmit one or more code division multiple access (CDMA) ranging code/ranging requests to one or more neighboring base stations while transmitting the UL packet, and to receive one or more ranging responses based on the CDMA ranging code/ranging requests; and
    updating logic configured to update ranging results based on the ranging responses.

25. The mobile device of claim 24, wherein the transceiver is configured to transmit the UL packet using a first set of subcarriers and to transmit the CDMA ranging code/ranging requests using a second set of subcarriers, wherein the first and second sets of subcarriers are within the same radio frequency (RF) channel.

26. The mobile device of claim 24, wherein the CDMA ranging code/ranging requests have a format in accordance with one or more standards of the Institute of Electrical and Electronics Engineers (IEEE) 802.16 family of standards.

27. A mobile device, comprising:

a first transceiver configured to transmit an uplink (UL) packet to a serving base station during a normal operation mode;

a second transceiver configured to transmit one or more code division multiple access (CDMA) ranging code/ranging requests to one or more neighboring base stations while transmitting the UL packet and to receive one or more ranging responses based on the CDMA ranging code/ranging requests; and updating logic configured to update ranging results based on the ranging responses.

28. The mobile device of claim 27, wherein the first transceiver is configured to transmit the UL packet using a different radio frequency (RF) channel than the second transceiver uses to transmit the CDMA ranging code/ranging requests.

29. The mobile device of claim 27, wherein the CDMA ranging code/ranging requests have a format in accordance with one or more standards of the Institute of Electrical and Electronics Engineers (IEEE) 802.16 family of standards.

30. A non-transitory computer-readable medium containing a program for maintaining updated ranging results for wireless communication, which, when executed by a processor, performs operations comprising:

(a) transmitting an uplink (UL) packet to a serving base station during a normal operation mode;

(b) transmitting one or more code division multiple access (CDMA) ranging code/ranging requests to one or more neighboring base stations while transmitting the UL packet;

(c) receiving one or more ranging responses based on the CDMA ranging code/ranging requests; and (d) updating ranging results based on the ranging responses.

31. The non-transitory computer-readable medium of claim 30, further comprising initiating a handover based on the updated ranging results.

32. The non-transitory computer-readable medium of claim 31, wherein initial ranging is not performed for the handover.

33. The non-transitory computer-readable medium of claim 30, further comprising repeating steps a-d to keep the ranging results updated.

34. The non-transitory computer-readable medium of claim 30, wherein the ranging results comprise at least one of timing, frequency, or power adjustment information.

35. The non-transitory computer-readable medium of claim 30, wherein the CDMA ranging code/ranging requests have a format in accordance with one or more standards of the Institute of Electrical and Electronics Engineers (IEEE) 802.16 family of standards.

* * * * *